(12) United States Patent
Lee et al.

(10) Patent No.: US 11,150,765 B2
(45) Date of Patent: Oct. 19, 2021

(54) DISPLAY DEVICE INCLUDING A TOUCH SENSOR AND A METHOD OF ELIMINATING NOISE

(71) Applicant: SAMSUNG DISPLAY CO., LTD., Yongin-si (KR)

(72) Inventors: Yoon Gyu Lee, Seoul (KR); Jae Cheon Park, Cheonan-si (KR); Seung Kyu Lee, Asan-si (KR); Sun Joon Hwang, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/802,202

(22) Filed: Feb. 26, 2020

(65) Prior Publication Data
US 2020/0301539 A1 Sep. 24, 2020

(30) Foreign Application Priority Data
Mar. 20, 2019 (KR) .......................... 10-2019-0031914

(51) Int. Cl.
*G06F 3/041* (2006.01)
(52) U.S. Cl.
CPC .......... *G06F 3/0418* (2013.01); *G06F 3/0412* (2013.01)
(58) Field of Classification Search
None
See application file for complete search history.

(56) References Cited

U.S. PATENT DOCUMENTS

| | | | |
|---|---|---|---|
| 7,852,412 B1* | 12/2010 | Guerrero | H04N 5/21 348/606 |
| 2010/0085486 A1* | 4/2010 | Chen | H04N 5/21 348/607 |
| 2014/0240246 A1* | 8/2014 | Kim | G06F 3/0412 345/173 |
| 2016/0342262 A1* | 11/2016 | Qian | G09G 3/00 |
| 2017/0097716 A1* | 4/2017 | Jeong | G06F 3/04166 |
| 2020/0201475 A1* | 6/2020 | Mani | G09G 3/3208 |

FOREIGN PATENT DOCUMENTS

| | | |
|---|---|---|
| JP | 4196580 | 10/2008 |
| KR | 10-1467214 | 12/2014 |
| KR | 10-1763939 | 8/2017 |
| KR | 101763939 B1 * | 8/2017 |

* cited by examiner

*Primary Examiner* — Kirk W Hermann
(74) *Attorney, Agent, or Firm* — F. Chau & Associates, LLC

(57) ABSTRACT

A display device is provided including a much sensor including a touch controller and a display panel overlapped by the touch sensor and configured to display an image. A display panel driver is, electrically connected to the display panel and configured to supply a driving signal to the display panel. The display panel driver is electrically connected to the touch controller and is configured to transmit a noise sensing signal to the touch controller.

18 Claims, 16 Drawing Sheets

DISPLAY DEVICE INCLUDING A TOUCH SENSOR AND A METHOD OF ELIMINATING NOISE

This application claims priority under 35 U.S.C. § 119 to Korean Patent Application No. 10-2019-0031914 filed on Mar. 20, 2019 in the Korean Intellectual Property Office, the disclosure of which is incorporated by reference herein in its entirety.

TECHNICAL FIELD

The present invention relates to a display device including a touch sensor and a method of eliminating noise.

DISCUSSION OF RELATED ART

A display device for displaying an image is used for various electronic appliances for providing an image to a user, such as smart phones, tablet personal computers (PCs), digital cameras, notebook computers, navigators, and televisions. The display device includes a display panel for generating and displaying an image and various input devices. For example, the display device may include a touch sensor for recognizing a touch input.

The display panel of the display device includes a plurality of switching elements and a plurality of signal lines such as scan lines and data fines for controlling the switching elements to apply data voltages to a plurality of pixels. When the data voltages of the display panel are swung, they may influence signals sensed by a touch sensor, thereby generating noise.

SUMMARY

According to an exemplary embodiment of the present invention, a display device is provided including a touch sensor including a touch controller. A display panel is overlapped by the touch sensor and configured to display an image. A display panel driver is electrically connected to the display panel and configured to supply a driving signal to the display panel. The display panel driver is electrically connected to the touch controller and is configured to transmit a noise sensing signal to the touch controller.

According to an exemplary embodiment of the present invention, a display device is provided including a display panel. A touch sensor is disposed on the display panel and a noise calculator is electrically connected to the display panel and the touch sensor. The noise calculator is configured to generate a noise sensing signal according to a difference value between digital video data in a first horizontal period and digital video data in a second horizontal period. The noise calculator is configured to transmit the noise sensing signal to the touch sensor.

According to an exemplary embodiment of the present invention, a method of eliminating noise is provided including generating a noise sensing signal using digital video data to be output to a display panel. The noise sensing signal is transmitted to a touch controller, and the touch controller is used to eliminate noise based on the noise sensing signal.

According to an exemplary embodiment of the present invention, a system for offsetting noise in an electronic device is provided including a semiconductor integrated circuit including a plurality of line buffers for receiving data. The semiconductor integrated circuit outputs a noise sensing signal based upon a difference in data received between two of the line buffers of the plurality of line buffers. A touch sensor including an amplifier is configured to receive the noise sensing signal and a touch sensing signal and adjust a reference voltage of the amplifier according to the noise sensing signal to offset noise included in the touch sensing signal.

BRIEF DESCRIPTION OF THE DRAWINGS

The above and other features of the present invention will become more apparent by describing in detail exemplary embodiments thereof with reference to the attached drawings, in which.

DETAILED DESCRIPTION OF THE EMBODIMENTS

The present invention will now be described more fully hereinafter with reference to the accompanying drawings, in which exemplary embodiments of the present invention are shown. This invention may, however, be embodied in different forms and should not be construed as limited to the exemplary embodiments set forth herein. The same reference numbers may be used to indicate the same, components throughout the specification. In the attached figures, the thickness of layers and regions may be exaggerated for clarity.

It will also be understood that when a layer is referred to as being "on" another layer or substrate, it can be directly on the other layer or substrate, or intervening layers may also be present.

Figure 1:
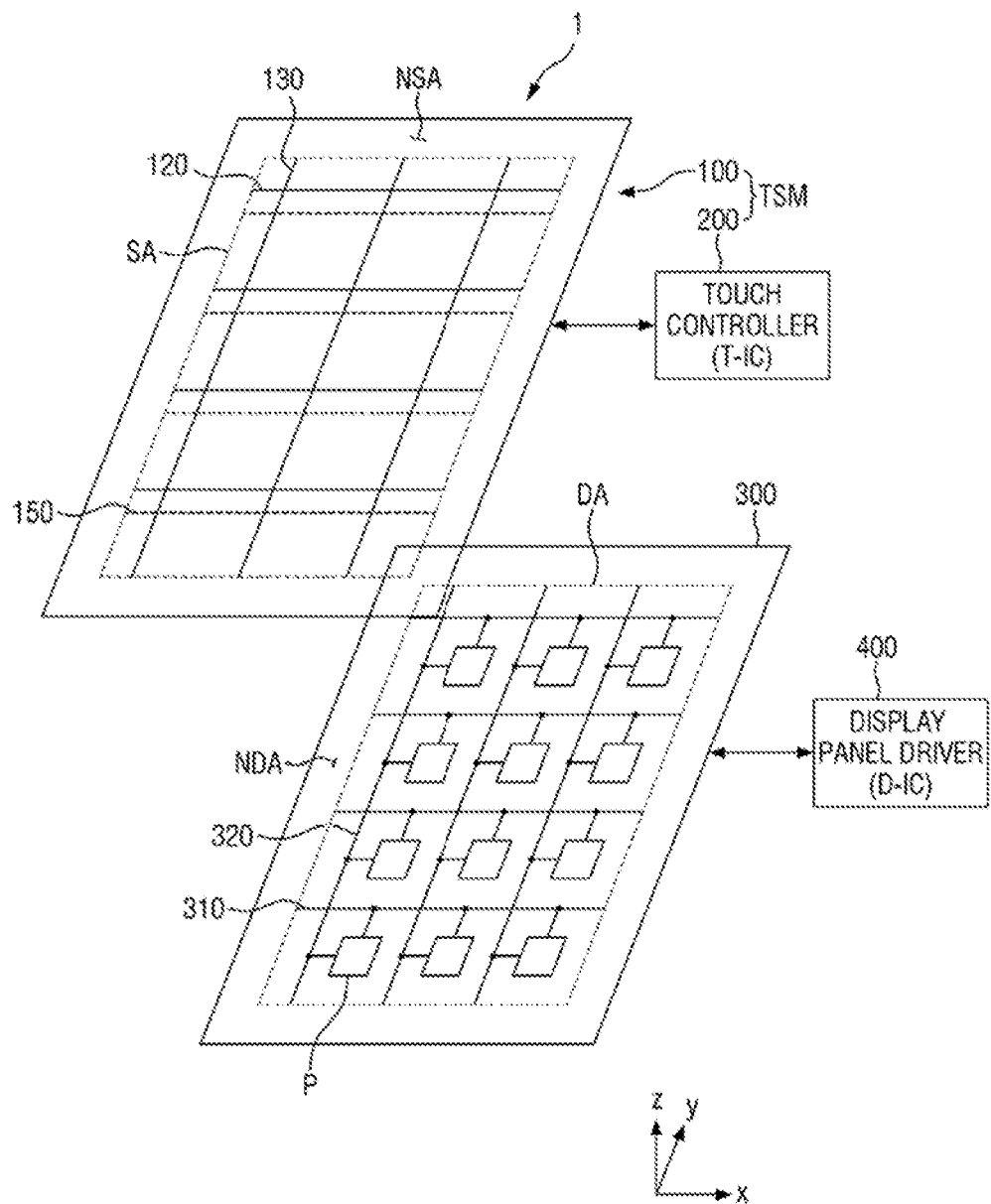
FIG. 1 is exploded perspective view schematically showing a display device according to an exemplary embodiment of the present invention.
Figure 2:
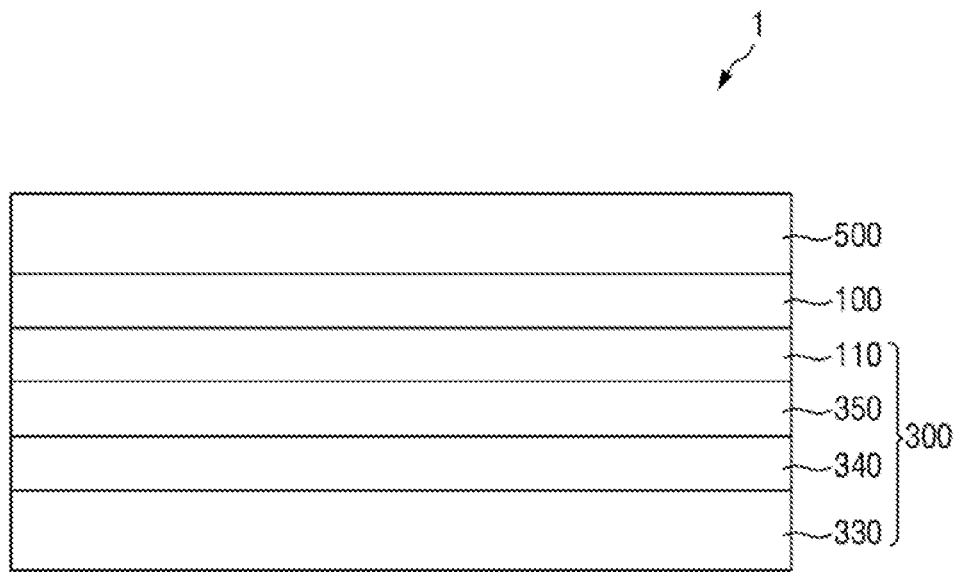
FIG. 2 is a schematic cross-sectional view of the display device shown in FIG. 1.
Figure 3:
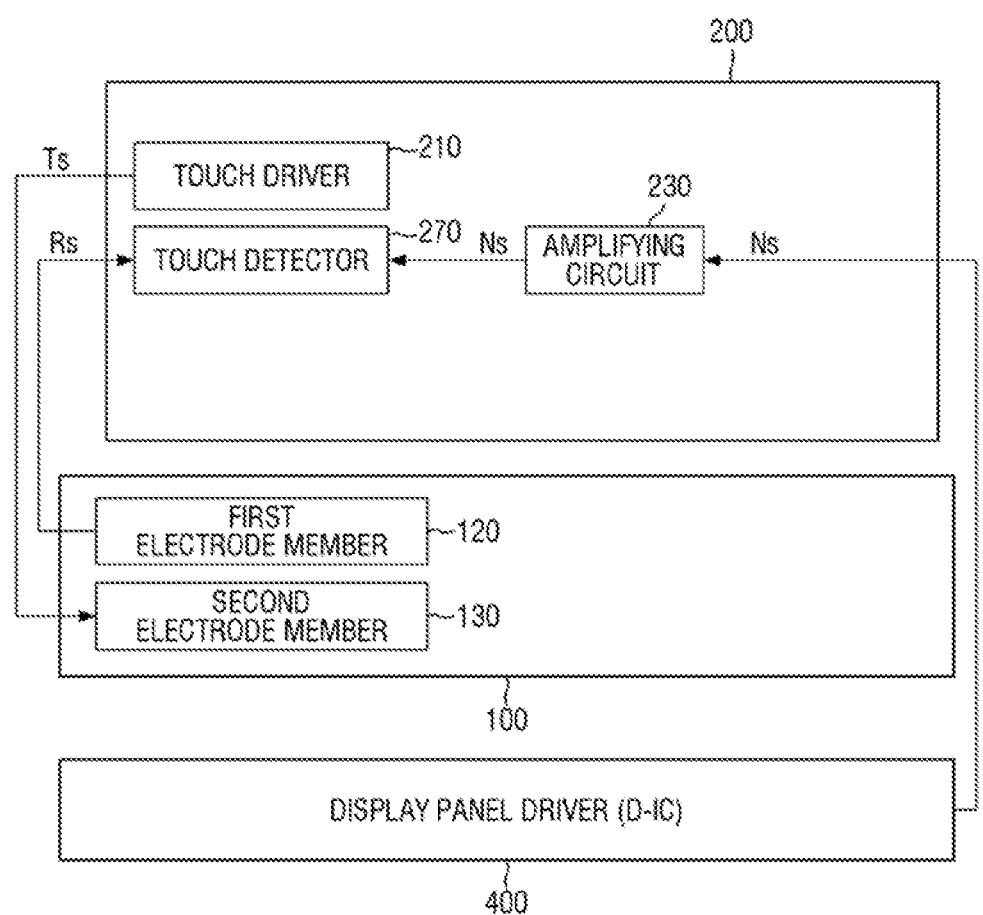
FIG. 3 is a block diagram of the touch sensor shown in FIG. 1.

FIG. 1 is an exploded perspective view schematically showing a display device according to an exemplary embodiment of the present invention, FIG. 2 is a schematic cross-sectional view of the display device shown in FIG. 1, and FIG. 3 is a block diagram of the touch sensor shown in FIG. 1.

Referring to FIGS. 1 to 3, a display device 1 according to an exemplary embodiment of the present invention includes a touch sensor TSM and a display panel 300, and may further include a display panel driver 400. The touch sensor TSM includes a touch sensing unit 100 and a touch controller 200.

Although it is shown in FIG. 1 that the touch sensing unit 100 and the display panel 300 are separated from each other, the present invention is not limited thereto. For example, the touch sensing unit 100 and the display panel 300 may be integrated with each other.

The display panel includes a display area DA and a non-display area NDA surrounding at least a pan of the display area DA. The display panel 300 ma include a Circuit driving layer 340 disposed on a base substrate 330 and a light emitting element 350 disposed on the circuit driving layer 340. The circuit driving layer 340 may include scan lines 310, data lines 320, and a plurality of thin film transistors, for driving the light emitting element 350. The display area DA of the circuit driving layer 340 may be provided with scan lines 310 and data lines 320 connected to a plurality of pixels P. The non-display area NDA of the circuit driving layer 340 may be provided with wirings for supplying various driving signals and/or driving powers for driving the pixels P.

The kind of the display panel 300 is not particularly limited. For example, the display panel 300 may be a self-luminous display panel, such as an organic light emitting display panel (OLED panel), a quantum dot light emitting display panel (QLED panel), a micro light emitting diode display panel, or a nano light emitting diode display panel. Alternatively, the display panel 300 may be a non-luminous display panel such as a liquid crystal display panel (LCD panel), an electrophoretic display panel (EPD panel), or an electro-wetting display panel (EWD panel), When the display panel 300 is a non-luminous display panel, the display device 1 may further include a backlight unit for supplying light to the display panel 300. Hereinafter, for convenience of explanation, a case where the display panel 300 is an organic light emitting display panel will be described as an example.

The display panel driver 400 is electrically connected to the display panel 300 to supply a signal necessary for driving the display panel 300. For example, the display panel driver 400 may include at least one of a scan driver for supplying a scan signal to the scan lines 310, a data driver for supplying a data signal to the data lines 320 and a timing controller for driving the scan driver and the data driver. According to an exemplary embodiment of the present invention, the scan driver, the data driver, and/or the timing controller may be integrated in one display IC (D-IC), but the present invention is not limited thereto. For example, according to an exemplary embodiment of the present invention, at least one of the scan driver, the data driver, and the timing controller may be integrated or mounted on the display panel 300.

The touch sensing unit 100 may be provided on at least one area of the display panel 300. For example, the touch sensing unit 100 may be provided on at least one surface of the display panel 300 so as to overlap the display panel 300. For example, the touch sensing unit 100 may be disposed on a surface (for example, an upper surface) of the display panel 300 in which images are emitted. Alternatively, the touch sensing unit 100 may be formed directly on at least one surface of the display panel 300, or may be formed inside the display panel 300. For example, the touch sensing unit 100 may be directly formed on an outer surface of an upper substrate (for example, a thin film encapsulation layer) or a lower substrate of the display panel 300 (for example, an upper surface of the upper substrate or a lower surface of the lower substrate), or may be directly formed on the inner surface of the upper substrate or lower substrate of the display panel 300 (for example, the lower surface of the upper substrate or the upper surface of the lower substrate).

The touch sensing unit 100 includes a sensing area SA and a peripheral area NSA surrounding at least a part of the sensing area SA. According to an exemplary embodiment of the present invention, the sensing area SA is an area for sensing the touch input of the touch sensing unit 100, and the peripheral area NSA may be an area of the touch sensing unit 100 that does not sense touch input. According to an exemplary embodiment of the present invention, the sensing area SA may be disposed to correspond to the display area DA of the display panel 300, and the peripheral area NSA may be, disposed to correspond to the non-display area NDA of the display panel 300. For example, the sensing area SA of the touch sensing unit 100 may overlap the display area DA of the display panel 300, and the peripheral area NSA of the touch sensing unit 100 may overlap the non-display area NDA of the display panel 300.

The sensing area SA of the touch sensing unit 100 may be provided thereon with a plurality of first touch electrode units 120 (also referred to in FIG. 3 as a first electrode member) and a plurality of second touch electrode units 130 (also referred to in FIG. 3 as a second electrode member) to detect a touch input.

The first touch electrode units 120 may be comprised of first touch electrodes connected to neighboring first touch electrodes along a first direction (e.g., an X direction) to form electrode rows which are spaced apart from each other in a second direction (e.g., a Y direction) intersecting the first direction (e.g., the X direction).

The second touch electrode units 130 may be comprised of second touch electrodes connected to neighboring second touch electrodes along the second direction (e.g., the Y direction) to form electrode columns which are spaced apart from each other in the first direction (e.g., the X direction). The second touch electrode units 130 may be spaced apart from the first touch electrode units 120, and may be insulated from the first touch electrode units 120.

Figure 8:
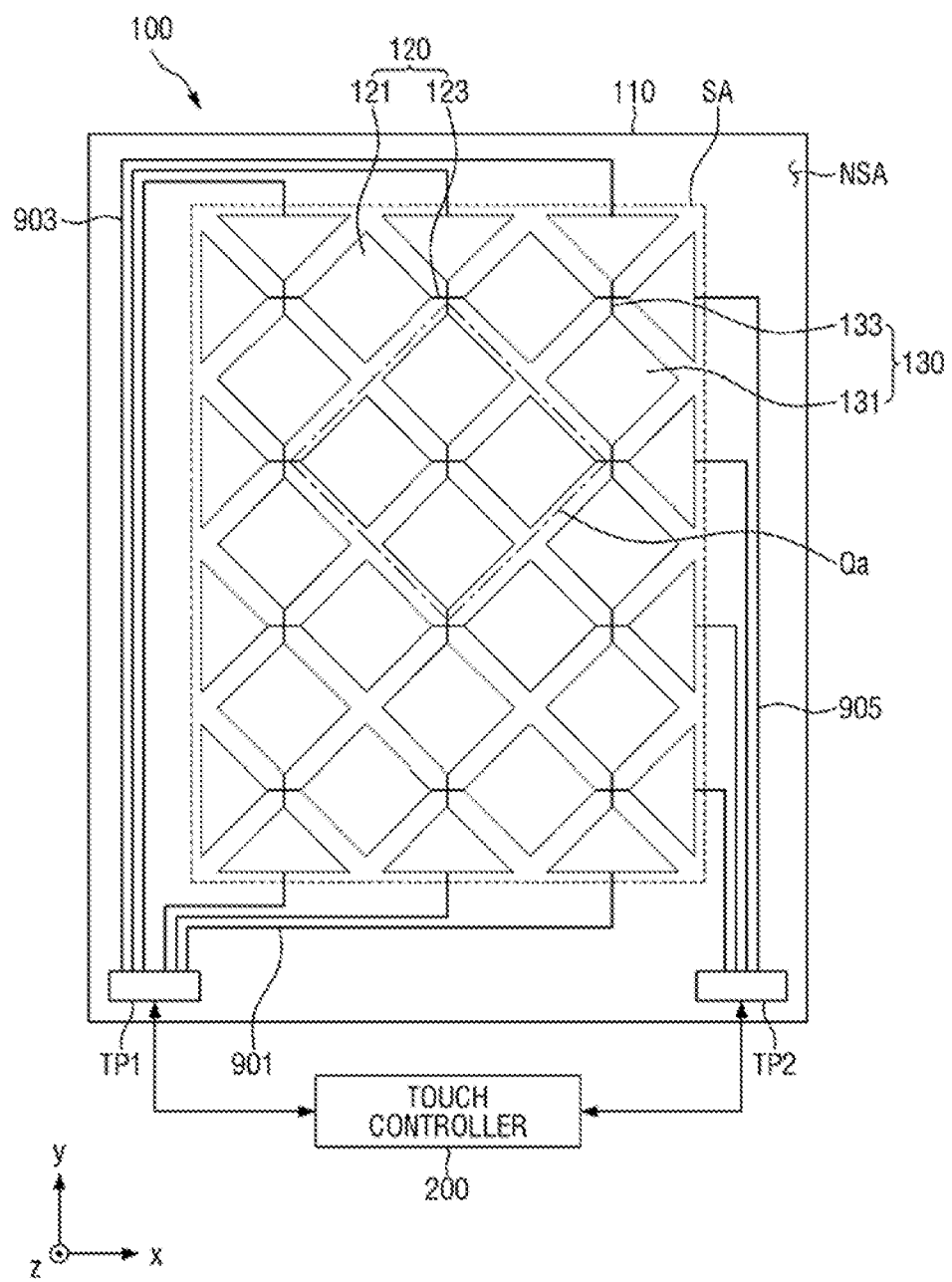
FIG. 8 is a plan view she wing a sensor unit of the touch sensor of FIG. 3 and a controller.

The shape, size, and/or arrangement direction of the first touch electrode units 120 and the second touch electrode units 130 are not particularly limited. For example, the first touch electrode units 120 and the second touch electrode units 130 may be configured as shown in FIG. 8, which will be described later.

The first touch electrode unit 120 and the second touch electrode unit 130 may be electrically connected to the touch controller 200. According to an exemplary embodiment of the present invention, the second touch electrode unit 130 may be a driving electrode unit that receives a driving signal Ts for touch detection from the touch controller 200, and the first touch electrode unit 120 may be a sensing electrode unit that outputs a sensing signal Rs for touch detection to the touch controller 200.

The first touch electrode unit 120 and the second touch electrode unit 130 may overlap at least one electrode of the display panel 300. For example, when the display panel 300 is an organic light emitting display panel, the first touch electrode unit 120 and the second touch electrode unit 130 may overlap the cathode electrode of the display panel 300.

The touch controller 200 may be electrically connected to the touch sensing unit 100 to supply a driving signal Ts to the touch sensing unit 100, and may receive a sensing signal Rs, from the touch sensing unit 100 to detect a touch position. Further, the touch controller 200 may be connected to the display panel driver 400 to receive a noise sensing signal Ns from the display panel driver 400.

According to an exemplary embodiment of the present invention, the touch controller 200 may further include a touch driver 210, a touch detector 270, and an amplifying circuit 230.

The touch driver 210 may provide a driving signal Ts for detecting a touch input to the second touch electrode unit 130.

The touch detector 270 may receive a sensing signal Rs from the first touch electrode unit 120 and detect the presence and/or position of the touch input. According to an exemplary embodiment of the present invention, the sensing signal Rs may be a change of mutual capacitance generated between the first touch electrode unit 120 and the second touch electrode unit 130. For example, when a touch input occurs, mutual capacitance is changed at a point where the touch input is provided or at the periphery thereof. The touch detector 270 may receive the change of mutual capacitance between the first touch electrode unit 120 and the second touch electrode unit 130 as the sensing signal Rs and detect the presence and/or position of the touch input using the received mutual capacitance change. Further, the touch detector 270 may receive a noise sensing signal Ns from the display panel driver 400, and may eliminate or offset a noise included in the sensing signal Rs by using the noise sensing signal Ns.

According to an exemplary embodiment of the present invention, the touch detector 270 may include at least one amplifier for amplifying the received noise sensing signal Ns, an analog-to-digital convener connected to the output terminal of the amplifier, and a processor. Details thereof will be described later with reference to FIG. 14.

The amplifying circuit 230 may be connected to the display panel driver 400 and the touch detector 270, and may amplify the noise sensing signal. Ns provided by the display panel driver 400 or adjust a gain value. According to an exemplary embodiment of the present invention, the amplifying circuit 230 may be located in the display panel driver 400. For example, the amplifying circuit 230 may amplify the noise sensing signal Ns provided by the display panel driver 400 or adjust the gain value and provide the amplified noise sensing signal Ns or the gain value to the touch detector 270.

According to an exemplary embodiment of the present invention, the touch driver 210, the touch detector 270, and the amplifying circuit 230 may be, integrated in one touch IC. However, the present invention is not limited thereto.

According to an exemplary embodiment of the present invention, at least one of the touch driver 210, the touch detector 270, and the amplifying circuit 230 may be located at a place other than the inside of the touch IC.

A protective layer 500 may be disposed on the touch sensing unit 100. The protective layer 500 may include, for example, a window member. The protective layer 500 may be attached onto the touch sensing unit 100 by an optical transparent adhesive or the like.

The display device 1 may further include an optical member. For example, an optical member such as a polarizing film may be interposed between the touch sensing unit 100 and the protective layer 500.

Figure 4:
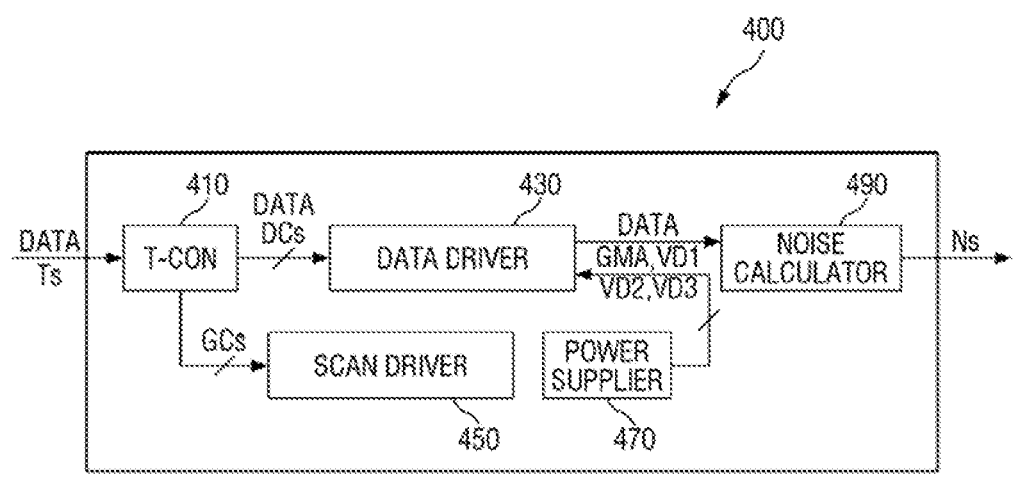
FIG. 4 is a block diagram of the display panel driver shown in FIG. 1.
Figure 5:
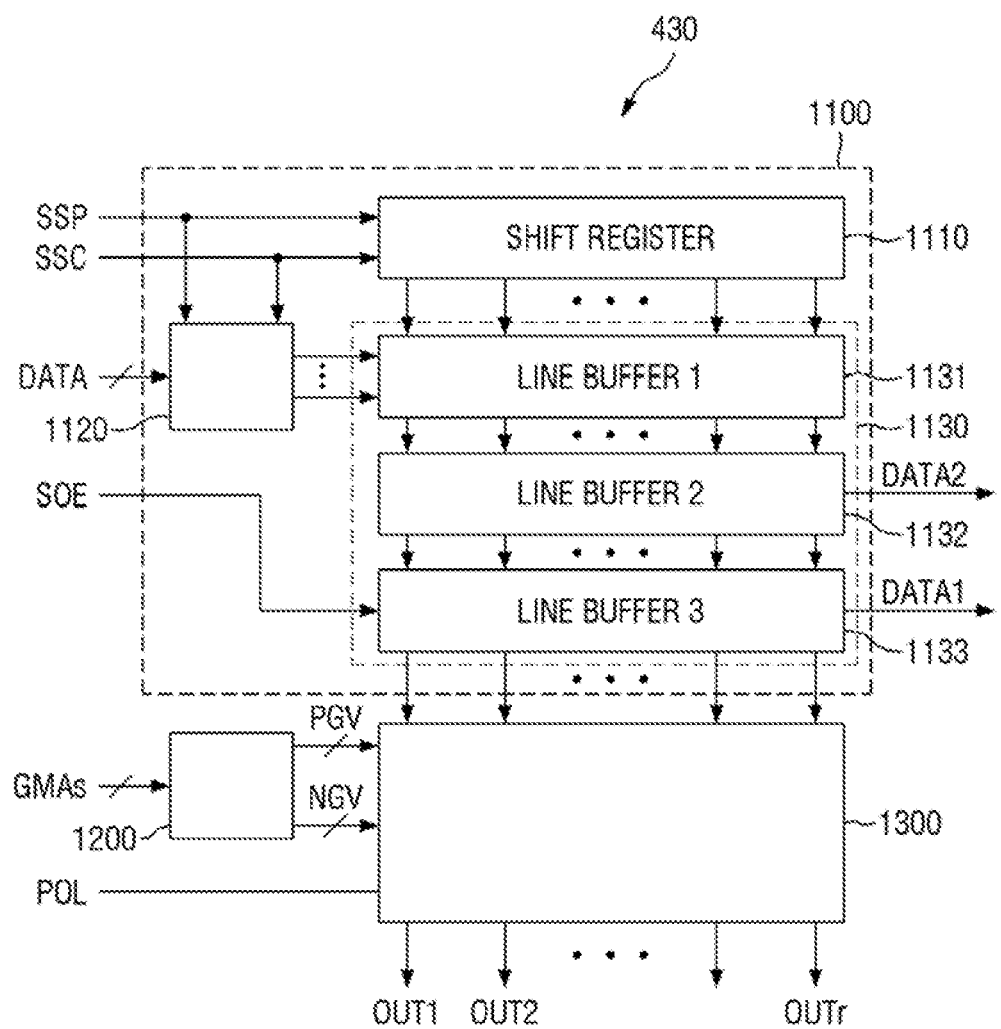
FIG. 5 is a block diagram of the data driver shown in FIG. 4.
Figure 6:
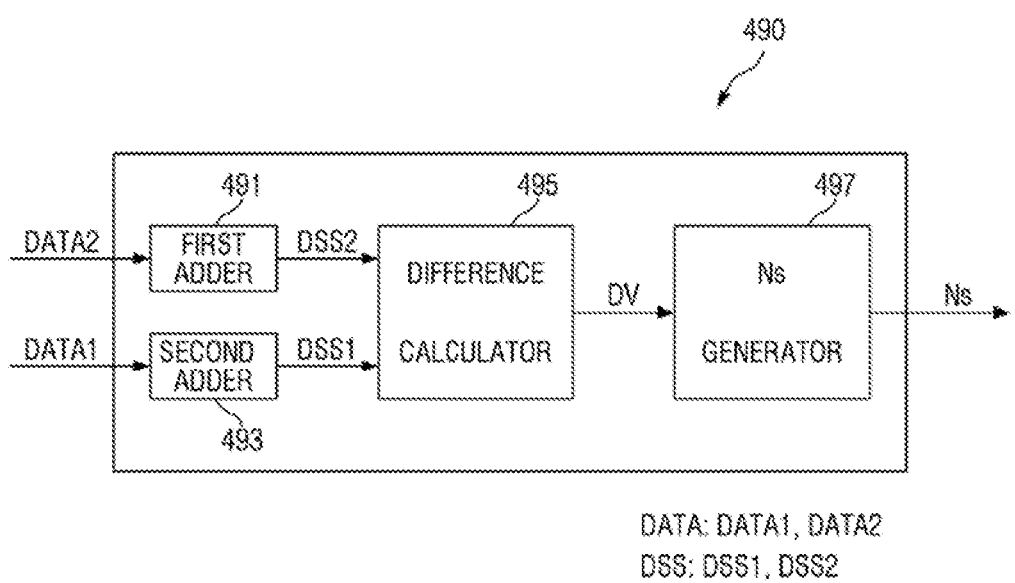
FIG. 6 is a block diagram of the noise calculator shown in FIG. 4.
Figure 7:
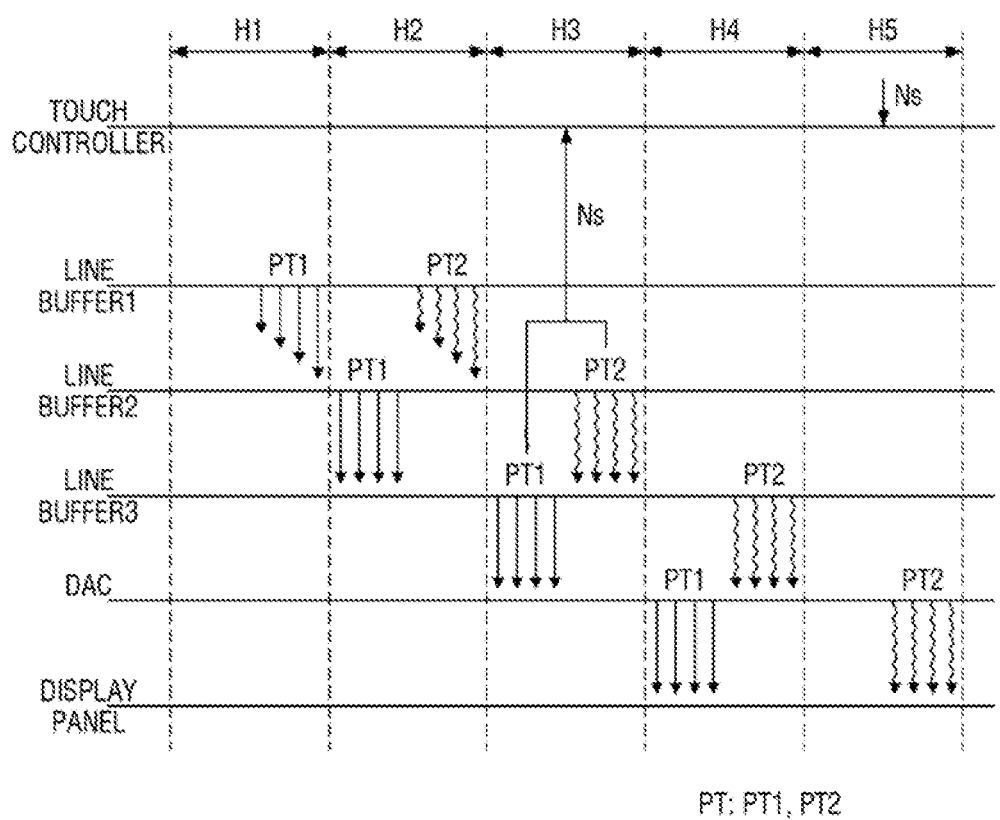
FIG. 7 is a schematic diagram showing a process of generating a noise sensing signal from a data driver and transmitting the noise sensing signal to a touch controller according to an exemplary embodiment of the present invention.

FIG. 4 is a block diagram of the display panel driver shown in FIG. 1, FIG. 5 is a block diagram of the data driver shown in FIG. 4, FIG. 6 is a block diagram of the noise calculator shown in FIG. 4, and FIG. 7 is a schematic diagram showing a process of generating a noise sensing signal from a data driver and transmitting the noise sensing signal to a touch controller according to an exemplary embodiment of the present invention.

Referring to FIG. 4 together with FIG. 1, the display panel driver 400 may include a timing controller 410, a data driver 430, a scan driver 450, a power supplier 470, and a noise calculator 490.

The timing controller 410 receives digital video data DATA and timing signals TS from a system processor controlling the display device 1. The timing signals TS may include a vertical synchronization signal, a horizontal synchronization signal, a data enable signal, a dot clock, and the like. The vertical synchronization signal may be a signal that defines one frame period, and the horizontal synchronization signal may be a signal that defines one horizontal period for supplying data voltages to the pixels P for one horizontal line of the display panel 300. The pixels P for one horizontal line may be connected to the same scanning line 310. The data enable signal may be a signal that defines a period during which valid digital video data DATA is supplied, and the dot clock may be a clock signal that is repeated in a predetermined period.

The timing controller 410 generates a scan control signal GCs for controlling the operation timing of the scan driver 450 and a data control signal DCs for controlling the operation timing of the data driver 430 based on the timing signals. The timing controller 410 outputs a scan control signal GCs to the scan driver 450, and outputs digital video data DATA and a data control signal DCs to the data driver 430.

The system processor air controlling the display device 1 converts the digital video data DATA into a format suitable for display on the display panel 300, and transmits the format to the timing controller 410. Further, the system processor for controlling the display device 1 may execute an application program of icons existing in touch coordinates according to touch low data or touch coordinate data, and may transmit digital video data DATA and timing signals TS to the timing controller 410 according to the executed application program.

The system processor for controlling the display device 1 may be a central processing unit (CPU) such as a CPU belonging to a navigation system, a set-top box, a DVD player, a blue-ray player, a personal computer (PC), a laptop, a home theater system, a broadcast receiver, a smart phone, a tablet, or portable electronic devices. The system processor for controlling the display device 1 may also be, for example, a host processor, an application processor, or a graphic processing unit (GPU). However, the present invention is not limited thereto.

The data driver 430 receives digital video data DATA and a data control signal DCs from the timing controller 410. The data driver 430 converts the digital video data DATA into analog data voltages according to the data control signal DCs. The analog data voltages may include positive polarity data voltages and negative polarity data voltages.

The scan driver 450 generates scan signals according to the scan control signal GCs input from the timing controller 410. The scan driver 450 supplies the scan signals to the scan lines 310 in a predetermined order. The predetermined order may be a sequential order, but is not limited thereto.

The power supplier 470 may generate gamma reference voltages GMAs and first to third driving voltages VD1, VD2, and VD3, and may supply the generated reference voltages GMAs and driving voltages VD1, VD2, and VD3 to the data driver 430. The data driver 430 may generate positive polarity gamma voltages and negative polarity gamma voltages using the gamma reference voltages GMAs and the first to third driving voltages VD1, VD2 and VD3. Further, the power supplier 470 may generate and supply voltages necessary for the timing controller 410 and the scan driver 450, respectively.

The noise calculator 490 may receive the digital video data DATA from the data driver 430, may calculate noise to be generated from the touch sensor TSM when the digital video data DATA is output to the display panel 300, and may generate a noise sensing signal Ns based on the noise and transmit the noise sensing signal Ns to the touch controller 200.

Referring to FIG. 5, the data driver 430 includes a digital processor 1100, a gamma voltage circuit 1200, and an analog processor 1300.

The digital processor 1100 includes a shift register 1110, a data receiver 1120, and line buffers 1130.

The shift register 1110 receives a source start pulse SSP and a source sampling clock SSC, and shifts the source start pulse SSP according to the source shift clock SSC to sequentially generate sampling clocks.

The data receiver 1120 receives clock signals and digital video data through transmission lines supplied as a pair of differential signals. The data receiver 1120 samples the digital video data on the basis of the clock signals, and transmits the sampled digital video data to line buffers 1130. The data receiver 1120 transmits the digital video data for one horizontal line to the line buffers 1130. The data receiver 1120 may receive the source start pulse SSP and the source sampling clock SSC, and may be driven in synchronization with the shift register 1110.

The line buffers 1130 may include a first line buffer 1131, a second line buffer 1132, and a third line buffer 1133. However, the present invention is not limited thereto, and the number of line buffers 1130 may be variously changed. Hereinafter, a case where the line buffers 1130 includes a first line buffer 1131, a second line buffer 1132, and a third line buffer 1133 will be described as an example.

The first line buffer 1131 sequentially stores the digital video data DATA for one horizontal line input from the data receiver 1120 in accordance with the sampling clock from the shill register 1110. The first line buffer 1131 outputs the digital video data. DATA for one horizontal line to the second line buffer 1132 at the same time. The second line buffer 1132 stores the digital video data DATA for one horizontal line input from the first line buffer 1131. The second line buffer 1132 outputs the digital video data DATA for one horizontal line to the third line buffer 1133 at the same time. The third line buffer 1133 stores the digital video data DATA for one horizontal line input from the second line buffer 1132, and simultaneously outputs the digital video data DATA for one horizontal line to the analog processor 1300 in accordance with the source output enable signal SOE.

The input, storage and output of the first line buffer 1131, the second line buffer 1132, and the third line buffer 1133 are sequentially performed. For example, when the first digital video data DATA1 is input to and stored in the fast line buffer 1131 and the first digital video data DATA1 is output from the first line buffer 1131 to the second line buffer 1132, the second digital video data DATA2 may be input to the first line buffer 1131. Further, the second digital video data DATA2 stored in the first line buffer 1131 may be output to the second line buffer 1132, the first digital video data DATA1 stored in the second line buffer 1132 may be output to the third line 1133, and new digital video data may be input to the first line buffer 1131.

Information on the noise generated in the touch sensor TSM may be acquired in advance through the first digital video data DATA1 stored in the third line buffer 1133 and the second digital video data DATA2 stored in the second line buffer 1132, Details thereof will be described later.

The gamma voltage circuit 1200 divides the gamma reference voltages GMAs using a resistance column circuit (R-String) to, generate positive polarity gamma voltages PGV and negative polarity gamma voltages NGV. The gamma voltage circuit 1200 supplies the positive polarity gamma voltages PGV and the negative polarity gamma voltages NGV to the analog processor 1300.

The analog processor 1300 converts the digital video data DATA output simultaneously from the digital processor 1100 into analog data voltages of positive polarity and negative polarity using the positive polarity gamma voltages PGV and negative polarity gamma voltages NGV supplied from the gamma voltage, circuit 1200. The analog processor 1300 may select one of positive polarity data, voltages and negative polarity data voltages according to a polarity control signal POL, and may output the selected voltage to the data lines.

The analog processor 1300 may output r data voltages OUT1, OUT2 and OUTr. The analog processor 1300 may output the same data voltages when the pixels P of any one row display the same gradation, and may output different data voltages when the pixels P of any one row display different gradation. The pixels P of any one row indicate pixels P connected to the same scanning line 310. Further, the analog processor 1300 may successively output the same data voltages to the data lines 320 when the pixels P connected to the data lines 320 display the same gradation, and may successively output different data voltages to the data lines 320 when the pixels P connected to the data lines 320 display different gradation.

Referring to FIG. 6, the noise calculator 490 may include a first adder 491, a second adder 493, a difference calculator 495, and a noise sensing signal generator 497.

The first adder 491 and the second adder 493 may receive digital video data DATA for one horizontal line from the line buffers 1130, and may sum the digital video data DATA for one horizontal line to calculate a data sum value. For example, the first adder 491 may receive second digital video data DATA2 from the second line buffer 1132, may generate a second data sum value DSS2, and may transmit the second data sum value DSS2 to the difference calculator 495. Further, the second adder 493 may receive a first digital video data DATA1 from the third line buffer 1133, may generate a first data sum value DSS1, and may transmit the first data sum value DSS1 to the difference calculator 495.

However, the present invention is not limited thereto. For example, when four or more line buffers 1130 are provided, the number of the adders 491 and 492 included in the noise calculator 490 may be three or more.

The difference calculator 495 compares the first data sum value DSS1 received from the first adder 491 with the second data sum value DSS2 received from the second adder 493 to calculate a difference value DV, and transmits the difference value DV to the noise sensing signal generator 497.

The noise sensing signal generator 497 may store preset noise data, may compare the difference value DV received from the difference calculator 495 with the preset noise data to calculate a noise value, and may generate a noise sensing signal Ns corresponding to the calculated noise value. Further, according to an exemplary embodiment of the present invention, the noise sensing signal generator 497 may use the difference value DV received from the difference calculator 495 as a noise value to generate a noise sensing signal Ns corresponding to the noise value. The noise sensing signal generator 497 may transmit the generated noise sensing signal Ns to the touch controller 200.

Specifically, a process where the noise sensing signal Ns is generated from the noise calculator 490 and is transmitted to the touch controller 200 will be described with reference to FIGS. 4 to 7. For convenience of explanation, in FIG. 7, the process is explained during first to fifth horizontal periods, and the digital video data DATA stored in the line buffers 1130 is represented by patterns PT In other words, the differences in the digital video data DATA stored in the line buffers 1130 is represented by a difference in shape between the patterns PT. In the diagram of FIG. 7, patterns PT (depicted as arrows) are transmitted to and stored in the line buffer from which they originate during each horizontal period. The direction of the arrow conveys a direction the patterns PT1 and the patterns PT2 will be transmitted in a subsequent horizontal period. The sloped shape of the collective arrows belonging to each of PT1 and PT2 stored in the first buffer line 1131 during the first horizontal period H1 and the second horizontal period H2, respectively, indicates sequential storage. Arrows of equal length are used to indicate substantially simultaneous transmission.

First patterns PT1 are stored in the first line buffer 1131 during the first horizontal period H1. The first patterns PT1 are sequentially stored in the first line buffer 1131 during the first horizontal period H1.

During the second horizontal period H2, the first patterns PT1 stored in the first line buffer 1131 are transmitted to the second line buffer 1132, and second patterns PT2 different from the first patterns PT1 are stored in the first line buffer 1131. The second patterns PT2 are sequentially stored in the first line buffer 1131, and the first patterns PT1 are simultaneously transmitted from the first line buffer 1131 to the second line buffer 1132.

During the third horizontal period H3, the second patterns PT2 stored in the first line buffer 1131 are transmitted to the second line buffer 1132, and the first patterns PT1 stored in the second line buffer 1132 are transmitted to the third line buffer 1133. New patterns may be sequentially stored in the first line buffer 1131. The second patterns PT2 are simultaneously transmitted from the first line buffer 1131 to the second line buffer 1132, and the first patterns PT1 are simultaneously transmitted from the second line buffer 1132 to the third line buffer 1133.

During the third horizontal period H3, the second patterns PT2 stored in the second line buffer 1132 and the first patterns PT1 stored in the third line buffer 1133, as described above, may correspond to the second digital video data DATA2 and the first digital video data DATA1, respectively, and the second data sum value DSS2 and the first data sum value DSS1 may be calculated through the first adder 491 and the second adder 493, respectively. Further, the difference calculator 495 may compare the first data sum value DSS1 and the second data sum value DSS2 to calculate a difference value DV, and the noise sensing signal generator 497 may generate a noise sensing signal Ns using the difference value DV and transmit the noise sensing signal Ns to the touch controller 200.

During the fourth horizontal period H4, the first patterns PT1 stored in the third line buffer 1133 are transmitted to a digital-analog convener DAC and convened into analog data voltages through the digital-analog convener DAC. The analog data voltages are transmitted to the display panel 300 through the data lines 320. A buffer unit may be disposed between the digital-analog convener (DAC) and the data lines 320, and the data voltages may be buffered by the buffer unit to have a constant level and supplied to the data lines 320. Further, the second patterns PT2 stored in the second line buffer 1132 are transmitted to the third line buffer 1133.

During the fifth horizontal period H5, the second patterns PT2 stored in the third line buffer 1133 are converted into analog data voltages through the digital-analog convener DAC, and the analog data voltages are transmitted to the display panel 300 through the data lines 320. As the second patterns PT2 different from the first patterns PT1 are transmitted to the display panel 300, the waveform of the ELVSS power supply voltage output according to the digital video data (DATA) stored in the analog processor 1300 changes, and this waveform change acts on the touch sensor TSM as a coupling noise causing touch sensitivity to deteriorate.

Thus, the touch controller 200 in the present exemplary embodiment of the present invention may apply the noise sensing signal Ns received from the noise sensing signal generator 497 to the touch detector 270 and/or the amplifying circuit 230 of the touch controller 200 during the fifth horizontal period H5, and thus the noise generated in the touch sensor TSM may be eliminated or offset at accurate timing. Further, the noise sensing signal Ns is generated through the digital video data DATA of the display panel driver 400, and thus there is no need to provide a separate noise sensing line in the touch sensor TSM, so manufacture can be simplified and the yield of the touch sensor. TSM can be increased. Eliminating or offsetting the noise using the noise sensing signal Na in the touch sensor TSM will be described in more detail later on herein.

Figure 9:
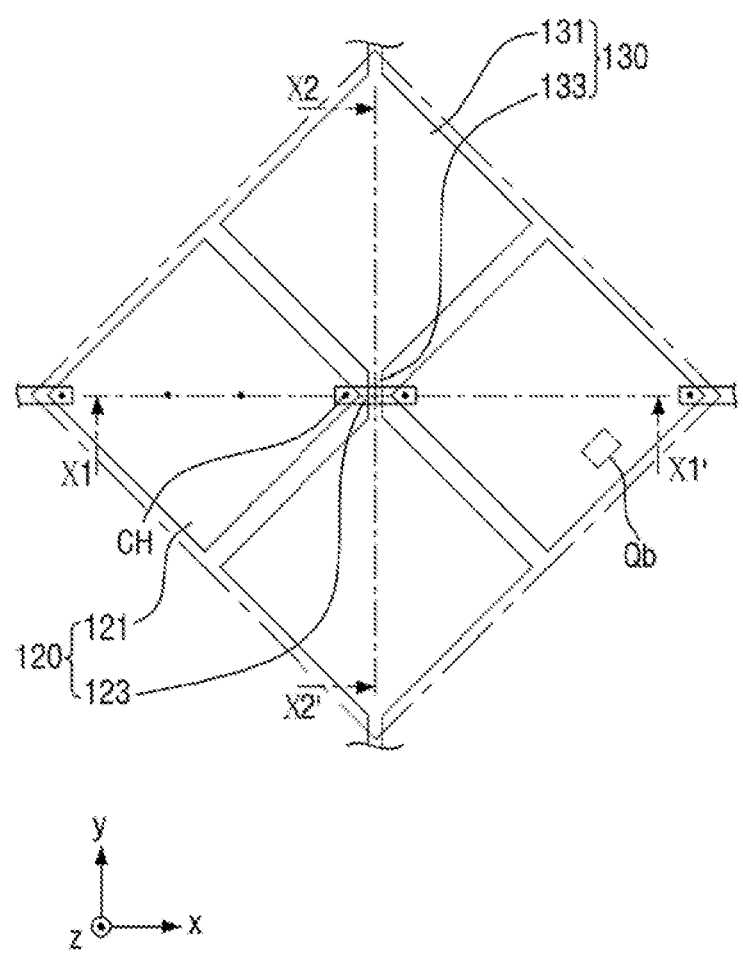
FIG. 9 is an enlarged plan view of the portion Qa of FIG. 8.
Figure 10:
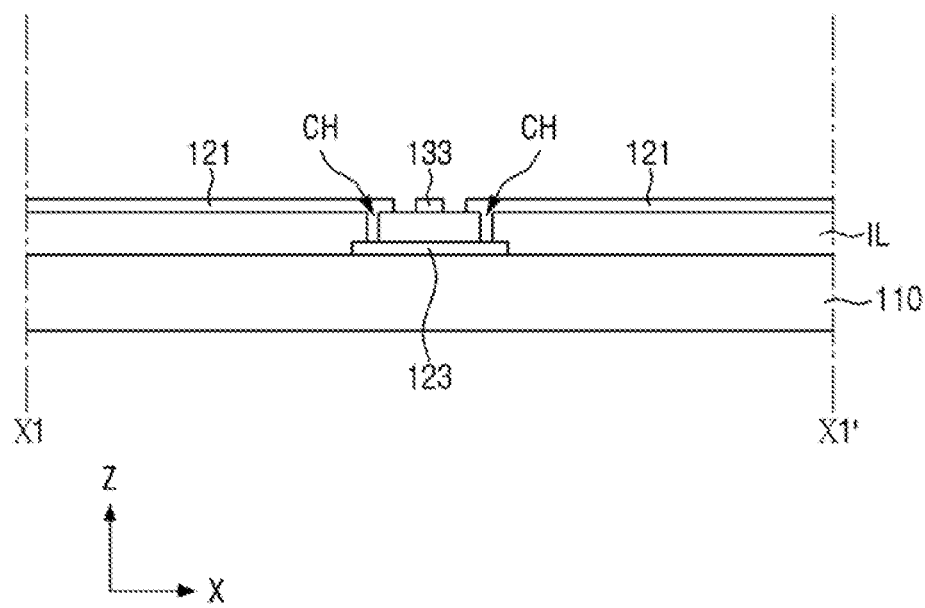
FIG. 10 is a cross-sectional view taken along the line X1-X1' of FIG. 9.
Figure 11:
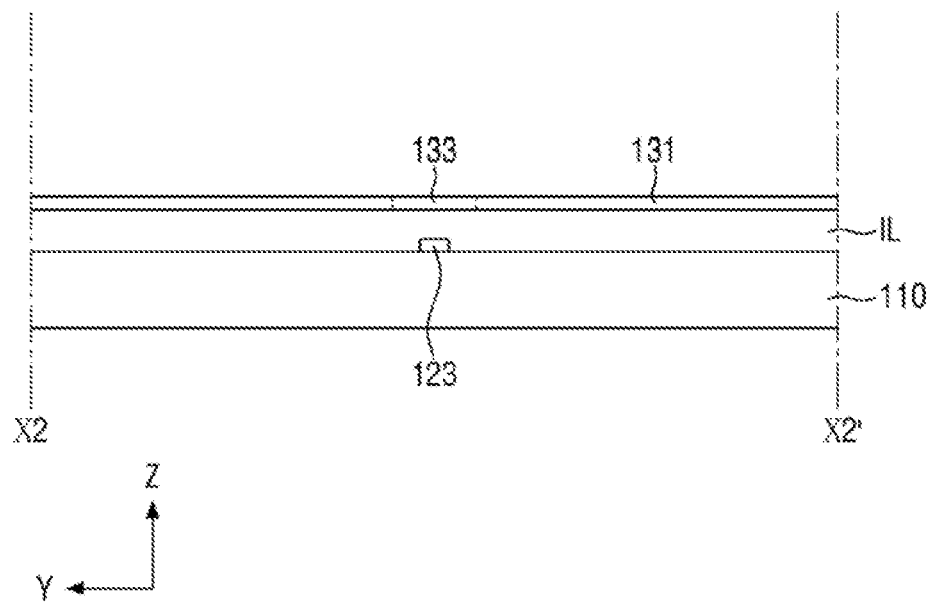
FIG. 11 is a cross-sectional view taken along the lines X2-X2' of FIG. 9.

FIG. 8 is a plan view showing the touch sensor of FIG. 3 which shows, a sensor unit, of a touch sensor, a sensor unit and a controller. FIG. 9 is an enlarged plan view of the portion Qa of FIG. 8. FIG. 10 is a cross-sectional view taken along the line X1-X1' of FIG. 9, and FIG. 11 is a cross-sectional view taken along the lines X2-X2' of FIG. 9;

Referring to FIGS. 8 to 11, the touch sensing unit 100 may include a base layer 110, first touch electrode units 120, and second touch electrode units 130.

The base layer 110 may include a sensing area SA and a peripheral area NSA. The base layer 110 may be a layer serving as a substrate of the touch sensing unit 100. According to an exemplary embodiment of the present invention, the base layer 110 may be one of the layers constituting the display panel 300, For example, in an exemplary embodiment of the present invention, the touch sensing unit 100 and the display panel 300 are integrated with each other and the base layer 110 may be at least one layer constituting the display panel 300. Illustratively, the base layer 110 may be a thin film encapsulation layer of the display panel 300. Alternatively, according to an exemplary embodiment of the present invention, the base layer 110 may be a rigid substrate made of glass, reinforced glass and/or a flexible substrate made of a thin film of a flexible plastic material. Hereinafter, a case where the base layer 110 is a layer included in the display panel 300, for example, as a thin film encapsulation layer, will be described as an example.

The first touch electrode units 120 and the second touch electrode units 130 may be arranged on the sensing area SA of the base layer 110.

As described above, the first touch electrodes may connect to neighboring first touch electrodes along the first direction (e.g., the X direction) to form first electrode units 120 which are spaced apart from each other in the second direction (e.g., the Y direction). Although it is illustrated in FIG. 8 that four first touch electrode units 120 are arranged along the second direction (e.g., the Y direction) to form four electrode rows, the present invention is not limited thereto, and the number of the first touch electrode units 120 may be variously changed.

The first touch electrode unit 120 may include a plurality of first touch electrodes 121 arranged in an electrode row extending in the first direction (e.g., the X direction) and a first connection portion 123 for electrically connecting the first touch electrodes 121 adjacent to each other along the first direction (e.g., the X direction). Hereinafter, in the descriptions of exemplary embodiments of the present invention, the term "connection" may mean an electrical or physical connection.

According to an exemplary embodiment of the present invention, the first touch electrode 121 may have a rhombic shape or a square shape, but the shape thereof is not limited thereto. The shape of the first touch electrode 121 may be changed into various shapes such as a triangle, a rectangle other than a rhombus, a pentagon, a circle, and a bar.

The first touch electrode 121 may include a conductive material. Illustratively, the conductive material may include a metal or an alloy thereof. Examples of the metal may include gold (Au), silver (Ag), aluminum (Al), molybdenum (Mo), chromium (Cr), titanium (Ti), nickel (Ni), neodymium (Nd), copper (Cu) and/or platinum (Pt). The first touch electrode 121 may include a transparent conductive material. Examples of the transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nanotube (CNT) and/or graphene.

According to an exemplary embodiment of the present invention, the first touch electrode 121 may have a single-layer structure, or may have a multi-layer structure. When the first touch electrode 121 has a multi-layer structure, the first touch electrode 121 may include a plurality of metal layers. Illustratively, the first touch electrode 121 may have a three-layer structure of titanium/aluminum/titanium.

According to an exemplary embodiment of the present invention, the first touch electrode 121 may have a mesh structure in order to prevent the first touch electrode 121 from being seen by a user. When the first touch electrode 121 has a mesh structure, the first touch electrode 121 may be disposed to overlap the light emission region of the display panel 300. In other words, the first touch electrode 121 of the mesh structure may define a mesh hole overlapping the light emission region.

The first connection portion 123 may electrically connect the first touch electrodes 121 adjacent to each other along the first direction (e.g., the X direction), and may be in contact with adjacent first touch electrodes 121, According to an exemplary embodiment of the present invention, the first connection portion 123 may be a bridge-type connection portion. According to an exemplary embodiment of the present invention, as shown in FIG. 10, the first connection portion 123 may be located on a layer different from the layer in which the first touch electrode 121 is located. For example, an insulating layer IL may be located between the first touch electrode 121 and the first connection portion 123. According to an exemplary embodiment of the present invention, the first connection portion 123 may be located on the base layer 110, the insulating layer IL may be located on the first connection portion 123, and the first touch electrode 121 may be located on the insulating layer IL, The first connection portion 123 and the first touch electrode 121 may be connected to each other through a first contact hole CH formed in the insulating layer IL. For example, the first connection portion 123 and the first electrode 121 may be in direct contact with each other through the first contact hole CH.

The insulating layer IL may include an insulating material, According to an exemplary embodiment of the present invention, the insulating material may be an inorganic insulating material and/or an organic insulating material. The inorganic, insulating material may include aluminum oxide, titanium oxide, silicon oxide, silicon oxynitride, zirconium oxide and/or hafnium oxide. The organic insulating material may include an acrylic resin, a methacrylic resin, polyisoprene, a vinyl resin, an epoxy resin, a urethane resin, a cellulose resin, a siloxane resin, a polyimide resin, a polyamide resin and/or a perylene resin.

The first connection portion 123 may include a conductive material. According to an exemplary embodiment of the present invention, the first connection portion 123 may include the same material as the first touch electrode 121, or may include a material selected from the materials exemplified as the constituent materials of the first touch electrode 121. According to an exemplary embodiment of the present invention, the first connection portion 123 may have a single-layer structure or a multi-layer structure. Illustratively, the first connection portion 123 may have a three-layer structure of titanium/aluminum/titanium. However, the present invention is not limited thereto, and the first connection portion 123 may include a different material from the first touch electrode 121.

Although it is shown in FIGS. 8 and 9 that one first connection portion 123 are disposed between the first touch electrodes 121 adjacent to each other along the first direction (e.g., the X direction), the number of the first connection portions 123 may be variously changed. For example, two or more first connection portions 123 may be disposed between the first touch electrodes 121 adjacent to each other along the first direction (e.g., the X direction).

As described above, the second touch electrode units 130 may connect to each other along the second direction e.g., the Y direction) to form electrode columns which are spaced apart from each other along the first direction (e.g., the X direction), Although it is illustrated in FIG. 8 that three second touch electrode units 130 are arranged along the first direction (e.g., the X direction) to form three electrode columns, the present invention is not limited thereto, and the number of the second touch electrode units 130 may be variously changed.

The second touch electrode unit 130 may include a plurality of second touch electrodes 131 arranged in the second direction (e.g., the Y direction) and a second connection portion 133 for electrically connecting the second touch electrodes 131 adjacent to each other along the second direction (e.g., the Y direction).

The plurality of second touch electrodes 131 may be electrically connected to each other along the second direction (e.g., the Y direction). Further, the second touch electrodes 131 may be spaced apart from each other along the first direction (e.g., the X direction).

According to an exemplary embodiment of the present invention, the second touch electrodes 131 may be located on the same layer as the first touch electrodes 121. The planar shape of the second touch electrode 131 may be rhombic, but is not limited thereto. The second touch electrode 131 may be formed in various shapes such as a triangle, a rectangle other than a rhombus, a pentagon, a circle, and a bar.

The second connection portion 133 may electrically connect the second touch electrodes 131 adjacent to each other along the second direction (e.g., the Y direction), and may be in contact with the second touch electrodes 131. According to an exemplary embodiment of the present invention, as shown in FIGS. 10 and 11, the second connection portion 133 may be located on the same insulating layer IL as the first touch electrodes 121 and the second touch electrodes 131.

The second connection portion 133 may be insulated from the first connection portion 123, and may intersect the first connection portion 123. According to an exemplary embodiment of the present invention, as shown in FIGS. 10 and 11, an insulating layer IL may be located between the second connection portion 133 and the first connection portion 123.

The second touch electrode 131 and the second connection portion 133 may include a conductive material. According to an exemplary embodiment of the present invention, the second touch electrode 131 and the second connection portion 133 may include the same conductive material as the first touch electrode 121.

According to an exemplary embodiment of the present invention, when the first touch electrode 121 has a mesh structure, each of the second touch electrode 131 and the second connection portion 133 may have a mesh structure, similar to the first touch electrode 121.

According to an exemplary embodiment of the present invention, the second touch electrode 131 may be a driving electrode receiving a driving signal Ts for detecting a touch position, and the first touch electrode 121 may be a sensing electrode for outputting a sensing signal Rs for sensing a touch position.

According to an exemplary embodiment of the present invention, as shown in FIG. 8, a first line 901, a second line 903 and a third line 905 may be arranged on the peripheral area NSA of the base layer 110.

The third line 905 is connected, to an outermost first touch electrode 121 each of the first touch electrode units 120. The first line 901 is connected to one end of each of the electrode columns. For example, the first line 901 may be connected to outermost second touch electrodes 131 disposed at one end of each of the second touch electrode units 130. The second line 903 is connected to the other end of each of the second touch electrode units 130. For example, the second line 903 is connected to outermost second touch electrodes 131 disposed at the other side of the second touch electrode units 130. The other end of the second touch electrode unit 130 refers to aside opposite to the one end of the second touch electrode unit 130 to which the first line 901 is connected. In other words, the line connected to the second touch electrode unit 130 may have a double routing structure, and thus the RC delay caused by the resistance or the like of the second touch electrode unit 130 may be increased. However, the present invention is limited thereto. Unlike that shown in FIG. 8, the first line 901 or the second line 903 may be omitted. In other words, according to an exemplary embodiment of the present invention, the line connected to the second touch electrode unit 130 may have a single routing structure.

A plurality of the first lines 901 and a plurality of the second lines 903 may be provided, and each of the first lines 901 and the second lines 903 may be connected to each of the second touch electrode units 138. Further, a plurality of the third lines 905 may be provided, and may be connected to the first touch electrode units 120.

Pad portions TP1 and TP2 may be located on the peripheral area NSA of the base layer 110. The pad portions TP1 and TP2 may be connected to the lines 901, 901, and 905. The touch controller 200 may be electrically connected to the pad portions TP1 and TP2. Although the touch controller 200 is shown as remotely spaced from the touch sensing unit 100, the present invention is not limited thereto. For example, the touch controller 200 may be disposed on the base layer 110 of the touch sensing unit 100 with the same connectivity.

According to an exemplary embodiment of the present invention, the pad portions TP1 and TP2 may include a first pad portion TP1 and a second pad portion TP2 that are spaced apart from each other along the first direction (e.g., the X direction). Illustratively, the first pad portion TP1 may be connected to the first line 901 and the second line 903, and the second pad portion TP2 may be connected to the third line 905. However, the present invention is not limited thereto. For example, the first pad portion TP1 and the second pad portion TP2 may be formed as one pad portion without being spaced apart from each other. The lines 901, 903 and 905 connected to the first pad portion TP1 and the second pad portion TP2 may be variously changed.

The first touch electrode 121 and the second touch electrode 131 may be simultaneously formed in a same process because they are located on the same layer. Thus the manufacturing process of the touch sensor TSM according to the aforementioned exemplary embodiment of the present invention is efficient. Further, the touch sensor TSM may be formed in a thin film shape because, the first touch electrode 121 and the second touch electrode 131 are located on the same layer. Moreover, the touch sensor TSM generates the noise sensing signal using the digital video data DATA of the display panel driver 400, and thus the malfunction of the touch sensor TSM may be minimized without providing a separate noise sensing line in the touch sensor TSM. Thus, the sensitivity of the touch sensor TSM may be increased.

Figure 12:
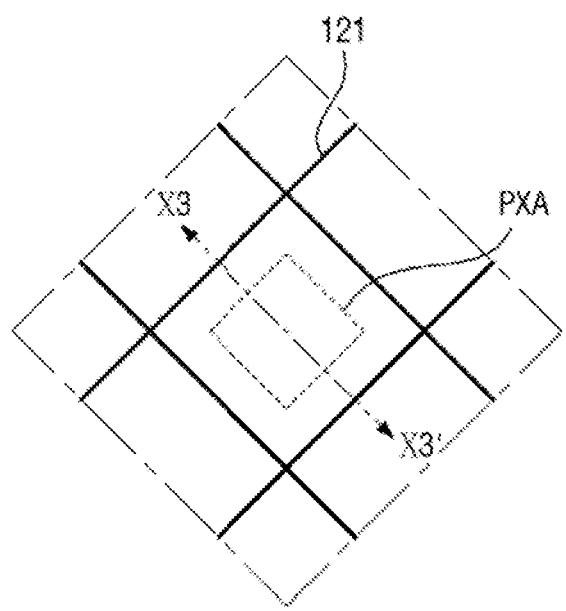
FIG. 12 is an enlarged plan view of the portion Qb of FIG. 9.
Figure 12:
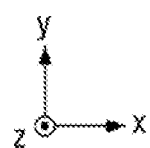
Figure 13:
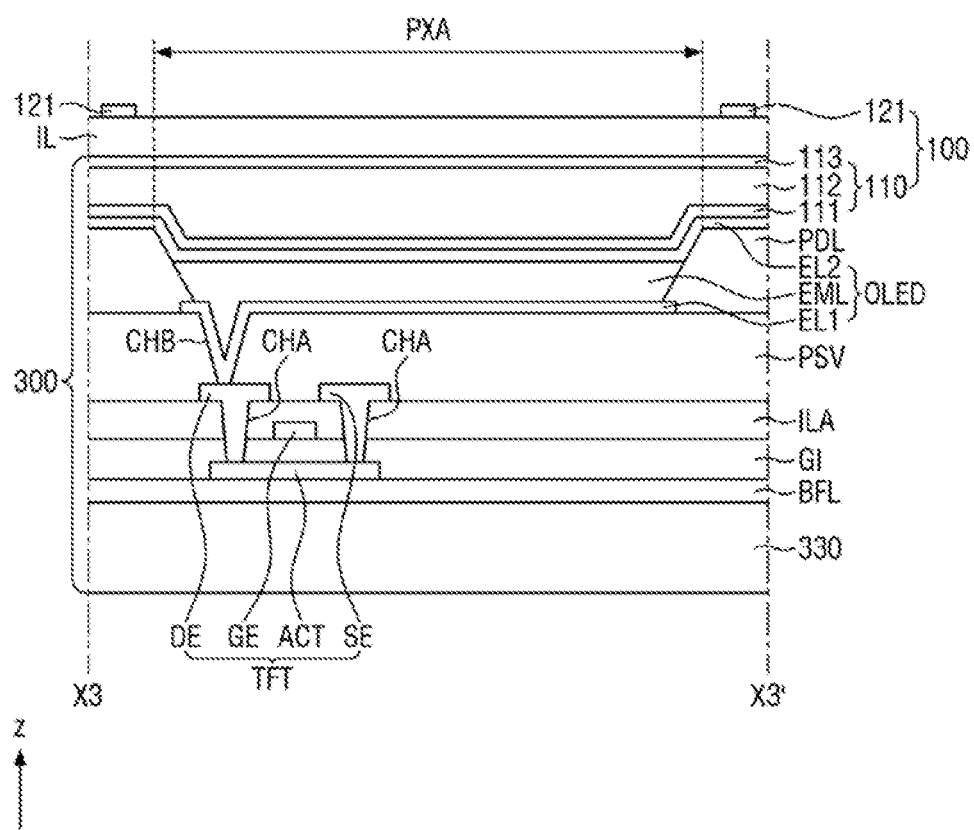
FIG. 13 is an exemplary cross-sectional view of a sensor unit and a display panel, taken along the line X3-X3' of FIG. 12.

FIG. 12 is an enlarged plan view of the portion Qb of FIG. 9, and FIG. 13 is an exemplary cross-sectional view of a sensor unit and a display panel, taken along the line X3-X3' of FIG. 12.

Referring to FIGS. 12 and 13, the touch sensing unit 100 may include a thin film encapsulation layer of a display panel (illustratively, an organic light emitting display panel) 300 as the base layer 110. For example, the display panel 300 and the touch sensing unit 100 may be formed integrally. The base layer 110 may be a thin film encapsulation layer. Hereinafter, the base layer 110 may also be referred to as the thin film encapsulation layer 110. For convenience, FIG. 13 will show a light emitting element (for example, organic light emitting diode (OLED)) and one thin film transistor TFT connected to the light emitting element, among the components provided to each pixel of the display panel 300.

The display panel 300 includes a base substrate 330, an, light emitting element OLED provided on one side of the base substrate 330, and a thin film encapsulation layer provided on the light emitting element OLED to at least cover the light emitting element OLED. Further, according to an exemplary embodiment of the present invention, the display panel 300 may further include at least one thin film transistor TFT connected to the light emitting element OLED. The thin film transistor TFT may be located between the base substrate 330 and the light emitting element OLED.

In addition, the display panel 300 may further include at least one power supply line, a signal line and/or a capacitor.

According to an exemplary embodiment of the present invention, the base substrate 330 may be a rigid substrate or a flexible substrate, and the material thereof is not particularly limited. For example, the base substrate 330 may be a thin film substrate having flexible characteristics.

A buffer layer BFL is provided on one side of the base substrate 330. The buffer layer BFL may prevent impurities from diffusing from the base substrate 330, and may increase the flatness of the base substrate 330. The buffer layer BFL may be provided as a single layer, but may also be provided as a multi-layer of at least two or more layers. The buffer layer. BEL may be an inorganic insulating film made of an inorganic material. For example, the buffer layer BFL may be formed of silicon nitride, silicon oxide and/or silicon oxynitride.

A thin film transistor TFT is provided on the buffer layer BFL. The thin film transistor TFT includes an active layer ACT, a gate electrode GE, a source electrode SE, and a drain electrode DE. According to an exemplary embodiment of the present invention, the active layer ACT is provided on the buffer layer BFL and may be formed of a semiconductor material. For example, the active layer ACT may be a semiconductor pattern layer made of polysilicone, amorphous silicone and/or oxide semiconductor. One region (for example, a region overlapping the gate electrode) of the active layer ACT may not be doped with impurities, and the remaining region thereof may be doped with impurities.

A gate insulating film GI may be provided on the active layer ACT, and the gate electrode GE may be provided on the gate insulating film GI. Further, an interlayer insulating film ILA may be provided on the gate electrode GE, and the source electrode SE and the drain electrode DE may be provided on the interlayer insulating film ILA. The source electrode SE and the drain electrode DE may be in contact with the active layer ACT through contact holes CHA penetrating the gate insulating film GI and the interlayer insulating film ILA, and may be electrically connected to the active layer ACT.

According to an exemplary embodiment of the present invention, a passivation layer PSV is provided on the source electrode SE and the drain electrode DE, The passivation layer PSV may cover the thin film transistor TFT.

A light emitting element OLED is provided on the passivation layer PSV. The light emitting element OLED may include a light emitting layer EML interposed between the first electrode EL1 and the second electrode EL2. According to an exemplary embodiment of the present invention, the first electrode EL1 of the light emitting element OLED may be an anode electrode. The first electrode EL1 of the light emitting element OLED is m contact with one electrode of the thin film transistor TFT, for example, the drain electrode DE through a contact hole CHB penetrating the passivation layer PSV. The first electrode EL1 is electrically connected to the drain electrode DE.

A pixel defining layer PDL for partitioning the light emitting area PXA of each pixel is provided on one surface of the base substrate 330 on which the first electrode EL1 of the light emitting element OLED is formed. The pixel defining layer PDL may expose the upper surface of the first electrode EL1, and may protrude from the base substrate 330 along the periphery of each pixel area.

A light emitting layer EML is provided in the light emitting area PXA surrounded by the pixel defining layer PDL. For example, the light emitting layer EML may be disposed on the exposed surface of the first electrode EL1. According to an exemplary embodiment of the present invention, the light emitting layer EML may have a multi-layer thin film structure including at least a light generating layer. For example, the light emitting layer EML may include a hole injection layer, a hole transport layer, a light generating layer, a hole blocking layer (HBL), an electron transport layer (ETL), and an electron injection layer (EIL). According to an exemplary embodiment of the present invention, the color of light generated in the light emitting layer EML may be one of red, green, and blue, but is not limited thereto. For example, the color of light generated in the light emitting layer EML may be one of magenta, cyan, and yellow.

The second electrode EL2 of the light emitting element OLED may be disposed on the light emitting layer EML. The second electrode EL2 of the light emitting element OLED may be a cathode electrode.

A thin film encapsulation layer 110 covering the second electrode EL2 of the light emitting element OLED may be provided on the second electrode EL2 of the light emitting element OLED. The thin film encapsulation layer 110 seals the light emitting element OLED. The thin film encapsulation layer 110 includes at least one inorganic film (hereinafter, referred to as encapsulation inorganic film). The thin film encapsulation layer 110 may further include at least one organic film (hereinafter referred to as an encapsulation organic film). The encapsulation inorganic film protects the light emitting element OLED from moisture/oxygen, and the encapsulation organic film protects the light emitting element OLED from foreign substances such as dust particles. When the light emitting element OLED is sealed using the thin film encapsulation layer 110, the thickness of the display device may be reduced, and flexible characteristics may be secured.

The thin film encapsulation layer 110 may have a multi-layer structure or single-layer structure. For example, the thin film encapsulation layer 110 may include a first encapsulation inorganic film 111, pan encapsulation organic film 112, and a second encapsulation inorganic film 113, which are sequentially laminated on the second electrode EL2.

According to an exemplary embodiment of the present invention, each of the first encapsulation inorganic film 114 and the second encapsulation inorganic film 113 may be made of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride (SiON) and/or lithium fluoride.

According to an exemplary embodiment of the present invention, the encapsulation organic film 112 may be made of acrylic resin, methacrylic resin, polyisoprene, vinyl resin, epoxy resin, urethane resin, cellulose resin and/or perylene resin.

However, the structure of the thin film encapsulation layer 110 is not limited to the above example, and the lamination structure of the thin film encapsulation layer 110 may be variously changed.

The aforementioned first connection portion 123 may be located cm the thin film encapsulation layer 110. The insulating layer IL of the touch sensor TSM may be located on the first connection portion 123. The first touch electrode 121, the second touch electrode 131, and the second connection portion 133 may be located on the insulating layer IL. In FIG. 13, only the first touch electrode 121 is shown. For example, the first touch electrode 121 is shown as overlapping the pixel defining layer PDL in a thickness direction. The first touch electrode 121 may have a mesh structure in order to prevent the first touch electrode 121 from being seen to a user, as described above, and may be disposed not to overlap the light emitting area PXA. In other words, a mesh hole overlapping the light emitting area PXA may be defined in the first touch electrode 121 of the mesh structure.

In the display device 1 according to the aforementioned exemplary embodiment of the present invention, the display panel 300 may be implemented as an organic light emitting display panel having the thin film encapsulation layer 110, and the components of the touch sensing unit 100 may be arranged on the thin film encapsulation layer 110.

Hereinafter, the touch position detecting operation and noise eliminating (or offsetting) operation of the touch sensor TSM will be described with reference to FIGS. 14 and 15.

Figure 14:
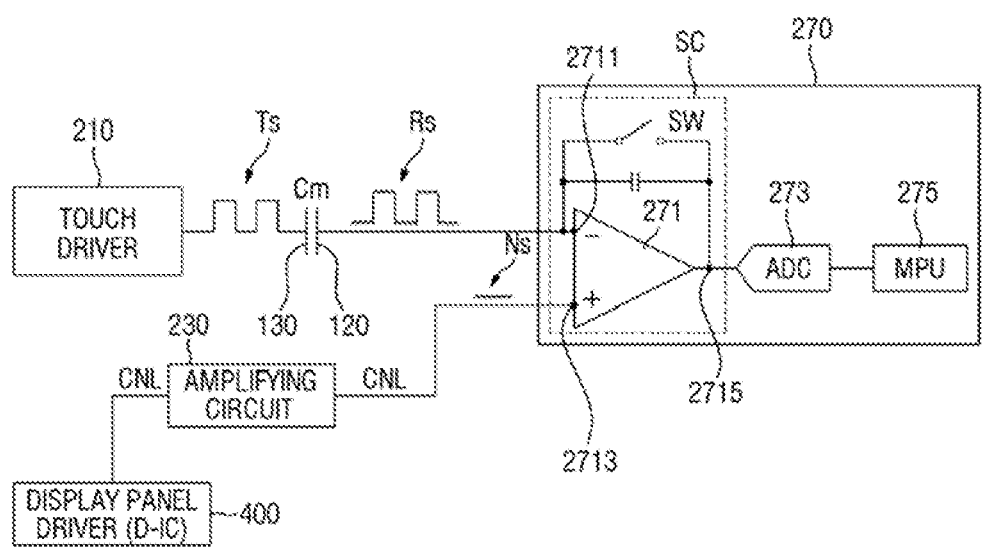
FIG. 14 is a block diagram showing a touch position detecting operation and a noise offsetting operation of the touch sensor according to an exemplary embodiment of the present invention.

FIG. 14 is a block diagram showing a touch position detecting operation and a noise offsetting operation of the touch sensor according to an exemplary embodiment of the present invention. FIG. 15 is a schematic plan view illustrating a connection between the touch sensing unit and the touch controller according to an exemplary embodiment of the present invention.

Figure 15:
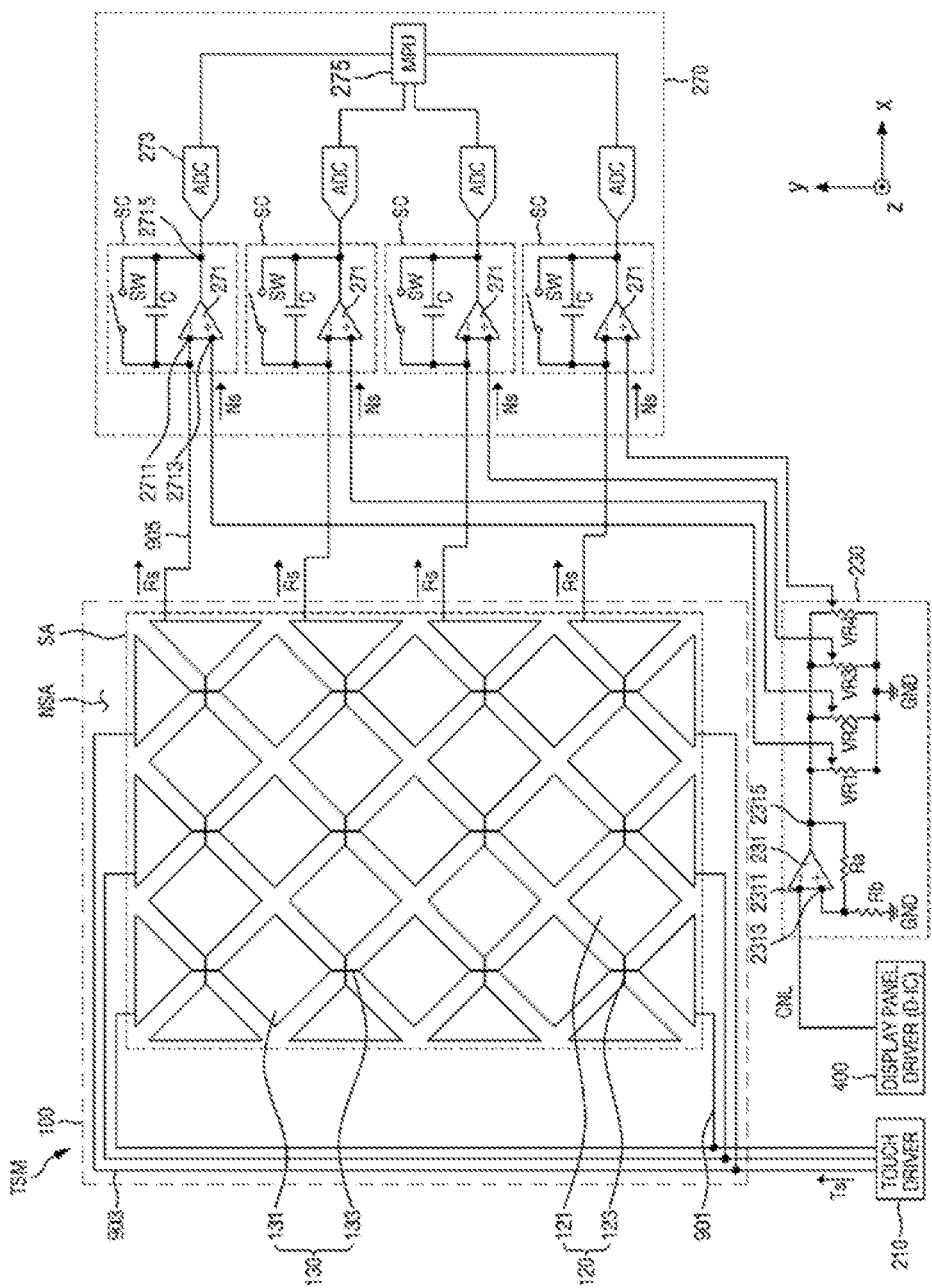
FIG. 15 is a schematic plan view illustrating a connection between the touch sensing unit and the touch controller according to an exemplary embodiment of the present invention.

Referring to FIGS. 14, 15, and 8, the touch driver 210 may provide driving signals Ts to the second touch electrode unit 130 through the first line 901 and/or the second line 903. According to an exemplary embodiment of the present invention, the driving signals TS may be sequentially provided to the second touch electrode unit 130.

The touch detector 270 may receive a sensing signal Rs from the first touch electrode unit 120 through the first line 901. According to exemplary embodiment of the present invention, as described above, the sensing signal Rs may include information about the mutual capacitance change generated between the first touch electrode unit 120 and the second touch electrode unit 130. For example, the sensing signal Rs may include information about a mutual capacitance change between at least one first touch electrode 121 and at least one second touch electrode 131 generated from an externally applied input (e.g., hovering or touch). When the driving signal Ts is provided to the second touch electrode unit 130, a mutual capacitance Cm is formed between the second touch electrode unit 130 and the first touch electrode unit 120. When an external input is applied, such as a touch input, the mutual capacitance Cm may be changed. Further, the first touch electrode unit 120 may output a sensing signal Rs corresponding to the driving signal is, and the sensing signal Rs output from the first touch electrode unit 120 may be input to the touch detector 270. According to an exemplary embodiment of the present invention, the sensing signal Rs may include information about the aforementioned mutual capacitance change.

According to an exemplary embodiment of the present invention, the touch detector may include a plurality of sensing channels SC electrically connected to each of the first touch electrode units 120. The touch detector 270 may further include an analog-to-digital converter (ADC) 273 connected to the sensing channel SC, and a processor 275. Hereinafter, although the sensing channel SC and the analog-to-digital converter 273 are described as separate configurations, according to an exemplary, embodiment of the present invention, the analog-to-digital converter 273 may be provided in each of the sensing channels SC.

The sensing channel SC may receive a sensing signal Rs from each, of the first touch electrode units 120, and may amplify and output the sensing signal Rs. According to an exemplary embodiment of the present invention, the sensing channel SC may include an analog front end including at least one amplifier 271, such as an operational amplifier.

The amplifier 271 may include a first input terminal 2711, a second input terminal 2713, and an output terminal 2715. According to an exemplary embodiment of the present invention, the first input terminal 2711 of the amplifier 271, for example, the inverting input terminal of the operational amplifier may be electrically connected to the first touch electrode unit 120 through the third line 905, and the sensing signal Rs may be input to the first input terminal 2711.

According to an exemplary embodiment of the present invention, the second input terminal 2713 of the amplifier 271 for example, the non-inverting input terminal of the operational amplifier, may be connected to the display panel driver 400 or the amplifying circuit 230 through the connection line CNL. The noise sensing signal Ns may be provided to the second input terminal 2713 of the amplifier 271. Thus, the reference voltage of each of the amplifiers 271 is changed according to the change of the noise sensing signal Ns calculated from the difference value of the digital video data DATA stored in the line buffers 1130. In other words, the reference potential of each of the amplifiers 271 may be changed according to the waveform change of the ELVSS power supply voltage output according to the digital video data DATA.

When the reference potential of the amplifier 271 is changed by using the noise sensing signal Ns generated through the difference value of the digital video data DATA stored in the line buffer 1130, the noise generated from the touch sensing unit 100 may be offset (or eliminated). Therefore, the signal output from the output terminal 2715 of the amplifier 271 may be a sensing signal from which noise was eliminated.

According to an exemplary embodiment of the present invention, the sensing channel SC may further include a capacitor C and a reset switch SW connected in parallel to each other between the first input terminal 2711 and output terminal 2715 of the sensing channel SC.

Although it has been described in the aforementioned exemplary embodiment of the present invention that the amplifier is realized as an inverting amplifier, the present invention is not limited thereto. According to an exemplary embodiment of the present invention, the amplifier may be a not-inverting amplifier.

The output terminal 2715 of the amplifier 271 may be electrically connected to the analog-to-digital converter 273.

The analog-to-digital converter 273 may convert the input analog signal into a digital signal. According to an exemplary embodiment of the present invention, the analog-to-digital converter 273 may be provided by the number of the first touch electrode units 420 so as to correspond to each first touch electrode unit 120 by 1:1. Alternatively, according to an exemplary embodiment of the present invention, the first touch electrode units 120 may be configured to share one analog-to-digital convener 273, in this case, a separate switch circuit for selecting a sensing channel may be further provided.

The processor 275 processes the signal (digital signal) convened from the analog-to-digital convener 273 and detects a touch input according to the signal processing result. For example, the processor 275 may comprehensively analyze the first sensing signal amplified by the amplifier 271 and converted by the analog-to-digital converter 273 to detect whether or not the touch input is generated and to detect the position of the touch input. According to an exemplary embodiment of the present invention, the processor 275 may be a microprocessor (MPU). In this case, a memory necessary for driving the processor 275 may be additionally provided in the touch detector 270. The configuration of the processor 275 is not limited thereto. According to an exemplary embodiment of the present invention, the processor 275 may be a microcontroller (MCU).

The touch controller 200 may further include an amplifying circuit 230 connected between the second input terminal 2713 of the sensing channel SC and the display panel driver 400. According to an exemplary embodiment of the present invention, the amplifying circuit 230 may include at least one amplifier 231. According to an exemplary embodiment of the present invention, the amplifier 231 may include a first input terminal 2311 connected to the noise sensing signal generator 497 of the display panel driver 400 through the connection line CNL, and a second input terminal 2313 connected to the output terminal 2315 through at least one resistor Ra. According to an exemplary embodiment of the present invention, the first input terminal 2311 and the second input terminal 2313 may be an inverting input terminal and a non-inverting input terminal, respectively, but are not limited thereto. For reference, Ra and Rb in FIG. 15 illustrate input and output impedances of the amplifier 231.

The amplifying circuit 230 may receive the noise sensing signal Ns from the display panel driver 400 via the connection line and the noise sensing signals Ns may be amplified to a degree corresponding to the gain value of the amplifier 231 and output to the respective sensing channels SC. The magnitude of the noise sensing signal Na input to the sensing channel SC may be easily adjusted by adjusting the gain value of the amplifying circuit 230, According to an exemplary embodiment of the present invention, the gain value of the amplifying circuit 230 may be adjusted such that the noise component included in the sensing signal Rs output from the first touch electrode unit 120 can be effectively offset in the sensing channel SC.

According to an exemplary embodiment of the present invention, the amplifying circuit 230 may further include a switch circuit. As shown in FIG. 7, the amplifying circuit 230 may receive the noise sensing signal Ns from the display panel driver 400 during the fifth horizontal period as shown in FIG. 7, and may not receive the noise sensing signal Ns from the display panel driver 400 during the first to fourth horizontal periods H1, H2, H3, and H4.

According to an exemplary embodiment of the present invention, the amplifying circuit 230 may include a plurality of variable resistors VR1, VR2, VR3, and VR4 connected in parallel to each other between the output terminal 2915 of the amplifier 231 and a predetermined reference power source GND, for example, a ground power source. For example, the amplifying circuit 230 may include variable resistors VR1, VR2, VR3, and VR4 corresponding to the number of the sensing channels SC.

According to an exemplary embodiment of the present invention, each of the sensing channels SC may be connected to a different one of the variable resistors VR1, VR2, VR3, VR4 provided in the amplifying circuit 230. For example, the second input terminal 2713 of the first sensing channel SC located at the uppermost side with reference to FIG. 15 may be connected to the first variable resistor VR1, the second, input terminal 2713 of the second sensing channel SC may be connected to the second variable resistor VR2. Further, the second input terminal 2713 of the third sensing channel SC may be connected to the third variable resistor VR3, and the second input terminal 2713 of the fourth sensing channel SC may be connected to the fourth variable resistor VR4.

According to the aforementioned exemplary embodiment of the present invention, the gain value of the noise sensing signal Ns input to the second input terminal 2713 of the sensing channel SC may be adjusted independently according to the magnitude of the noise component included in the sensing signal Rs input to each of the sensing channels SC. For example, for each position of the first touch electrode unit 120, the gain values of the noise sensing signals Ns input to the sensing channels SC connected to the first touch electrode units 120 may be differentially applied to the first touch electrode unit 120. For example, with reference to FIG. 15, the electrode row located at the uppermost and lowermost positions among the electrode rows of the first touch electrode unit 120 are referred to hereafter as a first electrode row and a last electrode row, respectively. The magnitude of the noise sensing signal Ns flowing into the touch sensing unit 100 may change from the first electrode row to the last electrode row in the sensing area SA. Illustratively, when the size of the noise, sensing signal Ns flowing into the sensor unit 100 gradually decreases from the first electrode row to the last electrode row in the sensing area SA, the gain value of the noise sensing signal Ns may be gradually reduced from the first sensing channel. SC connected to the first touch electrode unit 120 of the first electrode row to the last sensing channel SC connected to the first touch electrode unit 120 of the last electrode row. Accordingly, in order to more effectively offset the noise component included in the sensing signal Rs for each vertical position (for example, a Y coordinate) of the first touch electrode unit 120 in the touch sensing unit 100, the gain value of the noise sensing signal Ns may be independently adjusted.

Further, according to the aforementioned exemplary embodiment of the present invention, during a period in which the second touch electrode units 130 are sequentially driven, the resistance values of the variable resistors VR1, VR2, VR3 and VR4 are adjusted in units of sub-periods in which the respective second touch electrode units 130 may be adjusted, thereby independently adjusting the gain value of the noise sensing signal Ns in the units of sub-periods. Accordingly, it is possible to compensate for the magnitude variation of the noise that may occur at the left and right positions (for example, an X coordinate) of the touch sensing unit 100. Therefore, according to the aforementioned exemplary embodiment of the present invention, it is possible to more accurately and effectively offset the noise component included in the sensing signal Rs.

Figure 16:
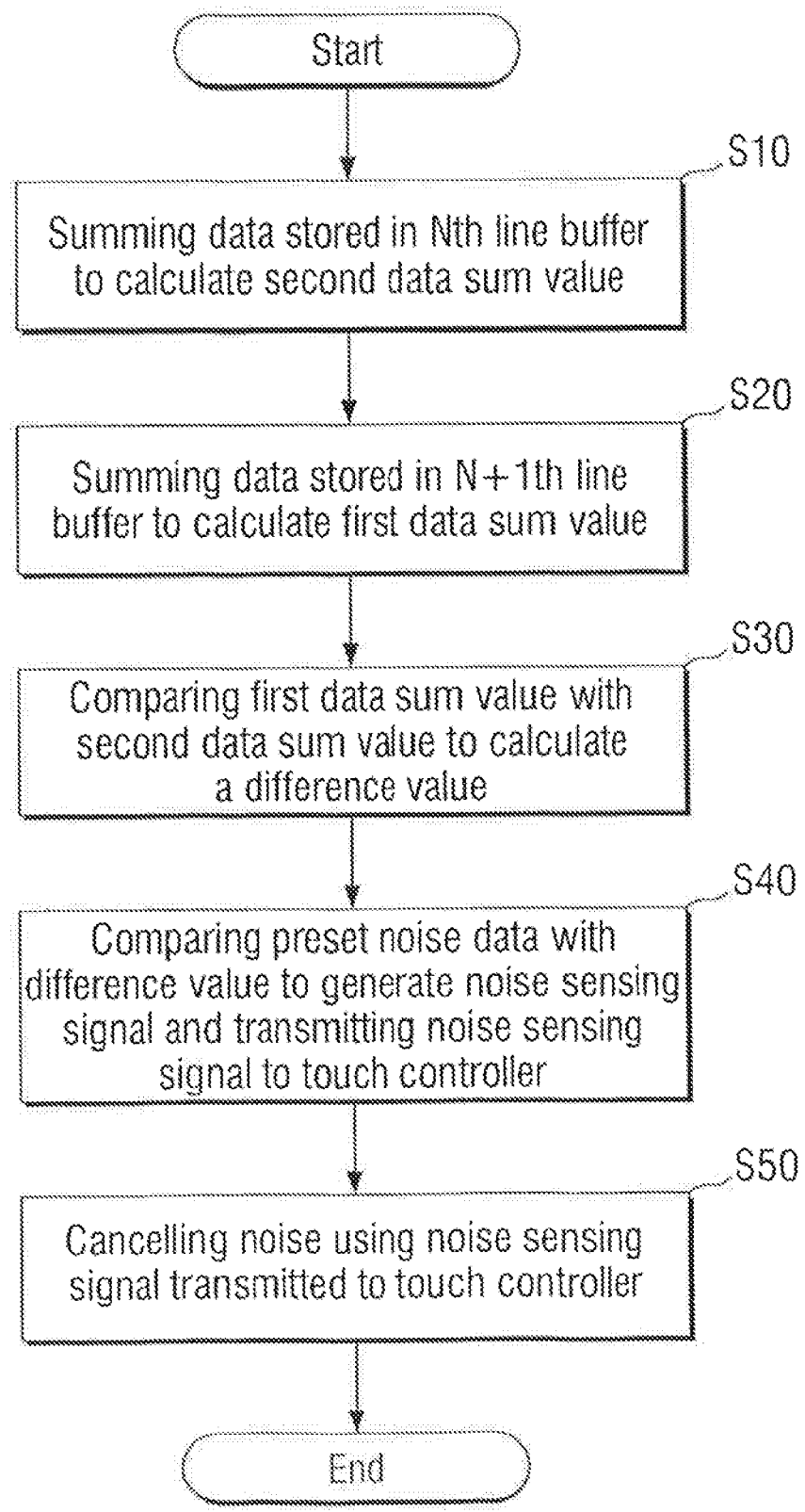
FIG. 16 is a flow diagram showing a noise eliminating method in a display device according to an exemplary embodiment of the present invention.

FIG. 16 is a block diagram schematically showing a noise eliminating method in a display device according to an exemplary embodiment of the present invention.

Referring to FIG. 16, first, the data stored in the Nth line buffer 1130 are summed to calculate a second data sum value DSS2 (S10). Next, the data stored in the N+1th fine buffer is summed to calculate a first data sum value DSS1 (S20).

For example, as shown in FIG. 6, the first adder 491 receives the second digital video, data DATA2 stored in the second line buffer 1132 and calculates the second data sum value DSS2, and the second adder 493 receives the first digital video data DATA1 from the third line buffer 1133 and calculates the first data sum value DSS1. The second data sum value DSS2 and the first data sum value DSS1 may be calculated at a different time or at the same time.

Next, the first data sum value DSS1 is compared with the second data sum value DSS2 to calculate a difference value (S30).

For example, as shown in FIG. 6, the difference value calculator 495 compares the first data sum value DSS1 received from the first adder 491 with the second data sum value DSS2 received from the second adder 493 to calculate a difference value DV.

Next, a noise sensing signal Ns is generated through the difference value DV and transmitted to the touch controller 200 (S40).

For example, as shown in FIG. 6, the noise sensing signal generator 497 generates a noise sensing signal Ns corresponding to the difference value DV received from the difference calculator 495 as a noise value and transmits the noise sensing signal Ns to the touch controller 200.

Next, the touch controller 200 performs noise cancellation noise elimination or offsetting) using the received noise sensing signal Ns (S50). Since the noise cancellation of the touch controller 200 has been described in detail with reference to FIGS. 14 and 15, and a redundant description will be omitted.

The touch sensor TSM according to the aforementioned exemplary embodiment of the present invention effectively offsets the noise signal introduced from the display panel 300 or the like, and can improve a signal-to-noise ratio (SNR). Accordingly, the malfunction of the touch sensor ISM according to the noise signal can be minimized, and the sensitivity of the touch sensor TSM can be improved.

As described above, according to exemplary embodiments of the present invention, provided is a display device including a touch sensor, which can improve the touch sensitivity by eliminating noise, and a method of eliminating noise.

The components included in the touch controller IC 200 and the display panel driver IC 400 includes circuitry for performing the functions described in this disclosure.

While exemplary embodiments of the present invention have been particularly shown and described, it will be understood by one of ordinary skill in the art that variations in form and detail may be made therein without departing from the spirit and scope of the present invention as set forth in the following claims.

What is claimed is:

1. A display device, comprising:
a touch sensor including a touch controller;
a display panel overlapped by the touch sensor and configured to display an image; and
a display panel driver electrically connected to the display panel and configured to supply a driving signal to the display panel,
wherein the display panel driver is electrically connected to the touch controller and is configured to transmit a noise sensing signal to the touch controller,
wherein the display panel driver includes
a data driver configured to output digital video data; and
a noise calculator configured to receive the digital video data, generate the noise sensing signal and transmit the noise sensing signal to the touch controller,
wherein the data driver includes a plurality of line buffers configured to store the digital video data, and an analog processor connected to the plurality of line buffers, and
the plurality of line buffers are configured to transmit the digital video data to the analog processor and the noise calculator.

2. The display device of claim 1,
wherein the plurality of line buffers includes a first line buffer for storing third digital video data, a second line buffer for storing second digital video data, and a third line buffer for storing first digital video data,
the second line buffer and the third line buffer are configured to transmit the second digital video data and the first digital video data to the noise calculator, respectively, and
each of the second digital video data and the first digital video data is digital video data for a first horizontal line.

3. The display device of claim 2,
wherein the noise calculator includes a first adder configured to sum the first digital video data to generate a first data sum value, and a second adder configured to sum the second video data to generate a second data sum value.

4. The display device of claim 3,
wherein the noise calculator further includes a difference calculator configured to receive the first data sum value from the first adder, receive the second data sum value from the second adder, and compare the first data sum value with the second data sum value to calculate a difference value.

5. The display device of claim 4,
wherein the noise calculator further includes a noise sensing signal generator configured to receive the difference value from the difference calculator to generate the noise sensing signal and transmit the noise sensing signal to the touch controller.

6. The display device of claim 1,
wherein the data driver further includes
a shift register configured to be electrically connected to one of the plurality of line buffers to transmit a sampling clock; and
a data receiver configured to be electrically connected to one of the plurality of line buffers to transmit the digital video data.

7. The display device of claim 1,
wherein the touch sensor includes a touch sensing unit, and
the touch sensing unit includes
a first touch electrode unit including a base layer,
the first touch electrode unit including a plurality of first touch electrodes arranged on the base layer in a first direction and electrically connected to each other along the first direction and
a second touch electrode unit including a plurality of second touch electrodes arranged on the base layer in a second direction crossing the first direction and electrically connected to each other along the second direction.

8. The display device of claim 7, further comprising:
a touch detector configured to be connected to the first touch electrode unit and configured to receive a sensing signal from the first touch electrode unit to detect a touch position.

9. The display device of claim 8,
wherein the touch detector is configured to receive a noise sensing signal from the noise calculator and offset noise of the noise sensing signal.

10. The display device of claim 9, further comprising:
an amplifying circuit connected to the touch detector and the noise calculator,
wherein the amplifying circuit includes an amplifier connected to the noise calculator, and a plurality of variable resistors connected to an output terminal of the amplifier in parallel to each other.

11. The display device of claim 10,
wherein the first touch electrode unit further includes a first connection portion connecting two neighboring first touch electrodes from among the plurality of first touch electrodes,
the second touch electrode unit further includes a second connection portion connecting two neighboring second touch electrodes from among the plurality of second touch electrodes and insulated from the first connection portion, and
the first connection portion and the second connection portion are disposed on different layers.

12. A display device, comprising:
a display panel;
a touch sensor disposed on the display panel; and
a noise calculator electrically connected to the display panel and the touch sensor, wherein the noise calculator is configured to generate a noise sensing signal according to a difference value between digital video data in a first horizontal period and digital video data in a second horizontal period,
wherein the noise calculator is configured to transmit the noise sensing signal to the touch sensor,
wherein the display device further includes a data driver configured to output the digital video data via a plurality of line buffers to the noise calculator and an analog processor.

13. The display device of claim 12,
wherein, the noise calculator further includes
a first adder configured to sum the digital video data in the first horizontal period to generate a first data sum value, and a second adder configured to sum the digital video data in the second horizontal period to generate a second data sum value.

14. The display device of claim 13,
wherein the noise calculator further includes a difference calculator, and
wherein the difference calculator is configured to receive the first data sum value from the first adder, receive the second data sum value from the second adder, and compare the first data sum value with the second data sum value to calculate the difference value.

15. The display device of claim 14,
wherein the noise calculator further includes a noise sensing signal generator configured to receive the difference value from the difference calculator to generate the noise sensing signal and transmit the noise sensing signal to the touch sensor.

16. A method of eliminating noise, comprising:
generating a noise sensing signal using digital video data to be output to a display panel, wherein the digital video data is provided from a plurality of line buffers that also transmit the digital video data to an analog processor that converts the digital video data into analog data voltages that are output to the display panel;
transmitting the noise sensing signal to a touch controller; and
using the touch controller to eliminate noise based on the noise sensing signal.

17. The method of claim 16,
wherein the generating the noise sensing signal and transmitting the noise sensing signal to the display panel includes:
summing digital video data in a first horizontal period to generate a first data sum value; and
summing digital video data in a second horizontal period to generate a second data sum value,
wherein the digital video data in the first horizontal period and the digital video data in the second horizontal period are sequentially output to the display panel.

18. The method of claim 17,
wherein the generating the noise sensing signal and transmitting the noise sensing signal to the display panel further includes:
comparing the first data sum value with the second data sum value to generate a difference value; and
generating the noise sensing signal based on the difference value.

* * * * *